April 4, 1967  G. R. EVANO  3,312,529
CHEMICAL PROCESS AUTOMATIC REGULATING SYSTEM
Filed Feb. 21, 1963  5 Sheets-Sheet 5

INVENTOR
GILBERT ROGER EVANO
BY
Bacon & Thomas
ATTORNEYS

United States Patent Office

3,312,529
Patented Apr. 4, 1967

3,312,529
CHEMICAL PROCESS AUTOMATIC
REGULATING SYSTEM
Gilbert Roger Evano, Arthez-de-Bearn, France, assignor
to Société Anonyme dite: Societe Nationale des Petroles
d'Aquitaine, Paris, France, a French company
Filed Feb. 21, 1963, Ser. No. 260,249
Claims priority, application France, Feb. 22, 1962,
888,995
5 Claims. (Cl. 23—255)

This invention relates to methods and systems for the automatic regulation and continuous monitoring of chemical processes in order to optimize the performance efficiency of the process at all times. The invention is more especially concerned with the regulation of the sulfur recovery process (so-called Claus process) involving an oxidation of an input gas containing hydrogen sulfide in accordance with a reaction representable as or In this process, it is obvious that if the yield in sulfur could be the theoretical 100%, the effluent gases, after separation of the free sulfur therefrom, would contain only water vapour. In practice this ideal condition is unattainable, and the effluent, in addition to the desired free sulfur, also contains a variable proportion of residual hydrogen sulfide ($H_2S$) as well as sulfur dioxide ($SO_2$) resulting from oxidation of the hydrogen sulfide. To maximize the yield it is necessary to adjust the operating conditions of the process in such a manner as to hold the combined concentration of both these unwanted constituents to a minimum in the effluent gas. The essential operating parameter to be adjusted for this purpose is the ratio of input gas to oxygen (or air) at the input to the sulfur recovery plant. Theoretical considerations show that when this input ratio is at its correct or optimum value, the ratio of hydrogen sulfide concentration to sulfur dioxide concentration ($H_2S/SO_2$ ratio) in the effluent gas is equal to 2. If the ($H_2S/SO_2$) ratio in the effluent is greater than 2, this is an indication that the rate of oxygen supply at the input of the plant is too low, i.e. the input-gas/oxygen ratio is too high, and ought to be reduced; if said ($H_2S/SO_2$) ratio is less than 2, the input gas/oxygen ratio should, conversely, be increased.

It is an object of this invention to provide an improved, fully automatic regulating system based on the above considerations and which will operate to effect the desired adjustments in the input parameter in such a manner as to bring about and maintain the desired optimum condition in the most effective, prompt and accurate manner.

While the invention has been developed for the specific purpose of regulating a sulfur recovery process of the type indicated above, it will be apparent that the principle on which it is based would be equally applicable to any chemical process in which a generally similar relationship obtains between the concentrations of two effluent constituents and an input parameter. It is, therefore, an explicit object of the invention to provide an automatic regulating or monitoring system applicable to chemical processes of this general character.

The invention therefore, in an important aspect, provides a regulating system for automatically monitoring a chemical process in which the sum of two effluent constituents is to be held at an extremum (i.e. maximum or minimum) condition for optimum performance of the process and wherein the ratio of said constituents is greater or less than a predetermined quantity according as an operating parameter of the process is on one or the other side of its optimum theoretical value, comprising: means for repeatedly sampling said effluent; means for determining said sum of constituents in each sample; means for determining said ratio of constituents in each sample; means for determining the sense of variation of said sum as between each sample and the preceding sample; means for adjusting said parameter; means for memorizing the sense of adjustment of said parameter at each adjustment thereof; means responsive to said sense-of-variation determining means and to said memorizing means and operatingly connected to said adjusting means for adjusting said parameter in the same sense as that memorized by said memorizing means if the sense-of-variation determined is of one sign; and means responsive to said sense-of-variation determning means and to said ratio-determining means and operatingly connected to said adjusting means for adjusting said parameter in one predetermined sense if the sense of variation determined is of the opposite sign and said ratio is more than said predetermined quantity, and for adjusting said parameter in the opposite sense if the sense of variation determined is of the opposite sign while said ratio is less than said quantity.

As will be more clearly understood from the ensuing disclosure, the combination of means thus provided and operated will be effective repeatedly to adjust the input parameter so as to bring said sum of effluent constituents to its desired extremum condition, and thereafter hold it in such condition.

Further objects of the invention include the provision of improved sampling means and improved analyzing means for use in regulating processes of the character described; the provision of improved computing circuitry for use in such processes; the provision of novel cyclic timed sequences providing successive regulating cycles each composed of two sequential steps respectively involving a determination of different chemical concentrations in the sampled effluent gas, specifically a phase involving the determination of the combined ($H_2S+SO_2$) content in the sample and a phase involving the determination of the $SO_2$ content in the same sample, wherefrom the desired ($H_2S/SO_2$) ratio can be derived by analogue computation. An object is to provide improved means in such a system for automatically and cyclically compensating for the unavoidable drift in the zero point of the analyzer. Further objects will appears.

A specific embodiment of the invention will now be described for purposes of illustration but not of limitation with reference to the accompanying drawings, wherein.

Figure 1:
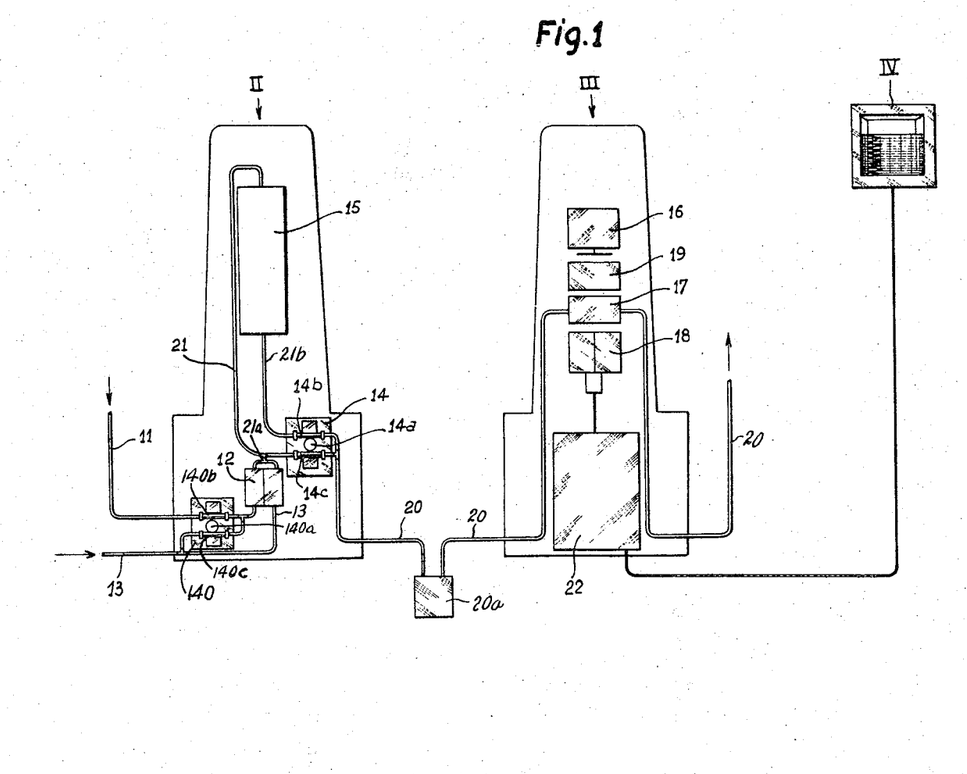
FIGURE 1 is a general schematic view in elevation of improved analyzer and regulator plant according to the invention as applied to a sulfur recovery process, wherein the effluent gas is at or above atmospheric pressure.
Figure 2:
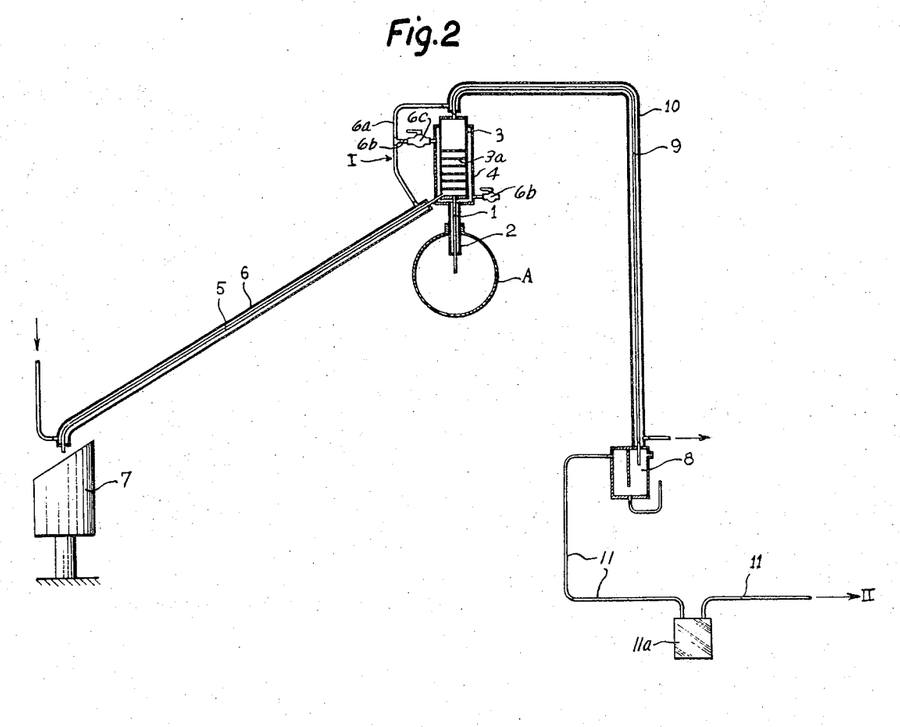
FIGURE 2 shows a sampling unit associated with the plant of FIGURE 1.

The analyzer system shown in the drawings, and particularly in FIGURES 1 and 2, is comprised of four main sections: a sampler unit I for taking samples of the effluent gases to be analyzed; an oxygenation reactor and valving unit II; an infra-red analyzer assembly III, and a recorder IV. In the embodiment shown in FIG- URES 1 and 2 it is assumed that the gas flow to be sampled is at atmospheric or super-atmospheric pressure. The sampling unit I functions to withdraw a representative sample of the effluent gas flowing through a conduit A, such as a sulfur recovery plant effluent conduit, strip the sample of the vesicular free sulfur contained in it, and discharge the sample under suitable pressure conditions into the reactor and valving section II. The sampler I comprises a tube 1 extending through the wall of conduit A to a point near the center axis thereof, and provided with a perforate steam jacket 2, adapted in operation to maintain the tube 1 at a temperature of about 140° C. The upper end of tube 1 connects with the base of a separator 3 containing a series of vertically spaced perforate trays 3a and externally surrounded by a steam jacket 4 for maintaining the separator at a temperature of about 105–110° C. by metering steam through jacket 4 by means of entry valve 6c, pipe 6b and steam exit valve 6d. In this temperature range, the high-viscosity sulfur particles entrained with the gas collect into drops of sufficient size to permit of efficient gravity separation. The separated free sulfur drops into the base of the separator through the perforations in the trays and is discharged by way of a discharge pipe 5 surrounded by the steam jacket 6 for maintaining its temperature at about 140° C., into a receiver such as conveniently located sulfur melting pot 7 of the plant. Steam jacket 6 is connected to steam jacket 10 by branch pipe 6a and to steam jacket 4 by means of pipe 6b and valve 6c. The purified gas sample issuing from the top of the separator 3 is delivered over a pipe 9, surrounded by a steam jacket 10 for maintaining its temperature at 140° C., into a tank 8 at atmospheric pressure, and thence by way of a pipe 11 and a selector valve device 140 later described into the reactor and valving unit II.

The unit II comprises a dual piston pump unit 12, so arranged that one of its pistons draws in the gas sample at atmospheric pressure through pipe 11 while the other piston simultaneously draws in an equal volume of atmospheric air by way of a line 13; valve device 140 being set with tube section 140b in open condition and collapsible parallel tube section 140c clamped shut by means of electronic control mechanism 140a. Both pistons deliver into a common outlet 21a, in which there is thus provided an equal volume mixture of the gas sample with air. This mixture is discharged into a selective valve device 14, which is operable as will presently appear to direct the mixture into the analyzer III either directly through a pipe 20, when the $SO_2$ content in the sample is to be determined in the analyzer, or indirectly into the analyzer by way of pipe 21, catalytic oxidation furnace 15 and pipe 21b, when the sum of the $SO_2$ and $H_2S$ contents in the sample is to be determined in the analyzer.

The selector valve device 14 is shown as comprising two parallel tube sections 14b, 14c of elastic plastic material mounted on a suitable support. A simple electromagnetic control mechanism generally designated 14a is provided, operative on energization of a solenoid therein to clamp one of the tubes 14b, 14c to a collapsed condition, and on deenergization to clamp the other of said tubes, whereby to direct the gas mixture from the pumping unit 12 by way of one or the other of the two paths defined above into the analyzer III. Specifically, with tube 14b clamped shut tube 14c directs the mixture through pipe 20 containing water collector 20a directly into the analyzer, while with tube 14c clamped shut tube 14b directs the mixture through pipe 21 first into the oxidizer unit 15 and thence into the analyzer. While various other and more conventional selector valve devices may be used for accomplishing the purpose described, the construction just described is found advantageous in that it does not oppose more than a negligible resistance to the gas flow through that one of the plastic tubes that is not collapsed, and moreover, danger of obstruction is eliminated by the large flow section of the plastic tubes, and corrosion of metallic parts such as valve members is avoided, in the presence of any residual sulfur particles in the gas mixture.

The oxidizer unit 15 is suitably an electric furnace, appropriately heat lagged, and of sufficient power rating to maintain the gas flow in a temperature range of from 390 to 470° C. It is provided internally with an oxygenation tube, not shown, containing oxygenation catalyst. The catalyst may comprise a body of porous crushed brick or porous alumina, of a particle size of the order of 3 mm., saturated with cadmium sulfate. To prepare the catalyst composition, 100 g. of the carrier is boiled 4 minutes in a solution of 90 g. cadmium sulfate in 100 ml. water, the sulfate-saturated carrier material is collected and dried in an oven one hour at 110° C. The catalyst body thus produced is inserted over a height of about 3 cm. into the central area of the oxygenation tube.

To produce the desired oxidation of the $H_2S$ content in the gas sample to $SO_2$, the constant volume of air is added to the gas sample through pipe 13 as mentioned above, thereby to provide a constant ratio of air to sample gas containing $H_2S$, and the mixture is passed through the oxygenation tube of unit 15 in which catalyst is present in the aforesaid temperature range of 390–470° C. In this range the oxidation yield of hydrogen sulfide to sulfur dioxide $SO_2$ is substantially 100%. Above about 470° C. the sulfur dioxide starts to oxidize to sulfur trioxide $SO_3$, a reaction that should be avoided.

Turning to the analyzer III, this is of the infrared absorption type and comprises an infrared source 16, an analyzer cell 17 and a receiver 18. The sample gas contains a considerable amount of carbon dioxide which has a common absorption band with sulfur dioxide (from 4.2 to 4.5 microns); accordingly, a filter 19 is interposed containing pure $CO_2$ for eliminating the influence of this constituent from the $SO_2$ content measurement.

The operating principle of the analyzer III utilizes the absorption properties of triatomic gases in the infrared radiation spectrum. $SO_2$ has two absorption bands in that spectrum, one relatively weak band in the 3.9–4.5 micron range, and the other a high-density band spreading over the range from 7 to 9.5 microns. Hydrogen sulfide on the other hand has a single band of very low density extending from 7 to 8.5 microns. These differential absorption properties between the two gaseous constituents are put to advantage in the analyzer of the invention for detecting the $SO_2$ content alone.

When the selector valve 14 is set to direct the gas sample through pipe 20 directly into the analyzer III, i.e. in a first phase of each cycle of the analyzing process later described in detail, the analyzer develops a D.-C. voltage signal which is proportional in magnitude to the $SO_2$ content in the sample; at this time the presence of $H_2S$ in the sample, owing to its very low absorption density in the infra-red spectrum noted above, results in a relative error less than 0.3%. When the selector valve 14 is set to direct the sample through pipe 21 and oxygenation unit 15 into the analyzer III, in a second phase of the cycle, the analyzer develops a D.-C. voltage signal proportional to the combined content of $SO_2$ and $H_2S$ in the sample, since the $SO_2$ content initially present in the sample has not been altered during the oxygenation step.

As will be later described, the electric control apparatus of the system is arranged to switch the setting of the selector valve 14 between its two positions, every 2 min. 30 sec., to provide the desired alternations between the two different phases of each analyzing cycle described above.

The D.-C. output signals delivered by the analyzer output unit 18 are applied via an amplifier 22 to a potentiometric recorder IV, of the unidirectional, continuous-line recording type. The set-up is such that the concentrations are recorded as a continuous curve alternating between two general levels or envelopes, the lower envelope representing the $SO_2$ concentrations and the upper envelope representing the combined $SO_2+H_2S$ concentrations. The recorder is provided with two minimum-switches and two maximum-switches, separately adjustable, acting periodically to actuate an automatic system for correcting drift of the zero potential of the analyzer, as will be later described more fully.

As will be described later, the information developed by the analyzer III and recorded in recorder IV, serves to make available to the regulator system of the invention, later described, two quantities one being the combined $(H_2S+SO_2)$ concentration, and the other the concentration ratio $H_2S/SO_2$. This ratio is derived from the aforementioned sum and the $SO_2$ concentration, since $$\frac{H_2S}{SO_2}=\frac{H_2S+SO_2}{SO_2}-1$$

Since all the concentrations are determined in the same analyzer unit, should the $(H_2S+SO_2)$ measurement be affected with an error coefficient K, then the $SO_2$ measurement is affected with the same error coefficient K. The $H_2S/SO_2$ ratio will remain accurately correct regardless of the error coefficient K, and moreover the minimum of the sum $(H_2S+SO_2)$ will remain constant regardless of K.

The system so far described with reference to FIGURES 1 and 2 is used in cases where the gas flow to be analyzed is at atmospheric or superatmospheric pressure, as earlier indicated. Should the gas flow to be analyzed be at subatmospheric pressure, the system is modified in the manner now to be described with reference to FIGURE 3, in which components corresponding in function to those of FIGURES 1 and 2 bear the same references primed, so that a summary description will suffice. The main difference is that in this case the gas sample from the sampler I' is circulated through the system by means of a dual-piston volume pump 23 positioned beyond the analyzer III rather than immediately beyond the sampler as in the first embodiment. Moreover all measuring operations are carried out at a temperature higher than the dew point of the water content in the gas sample, i.e. about 140° C. Accordingly, all the parts of the system including connecting lines and unions, etc. . . . are maintained at that temperature by means of steam jackets 10', with the exception of the gas circulating pumps 23 and an air injector 24, presently described, both positioned beyond the analyzer in the gas flow circuit.

Figure 3:
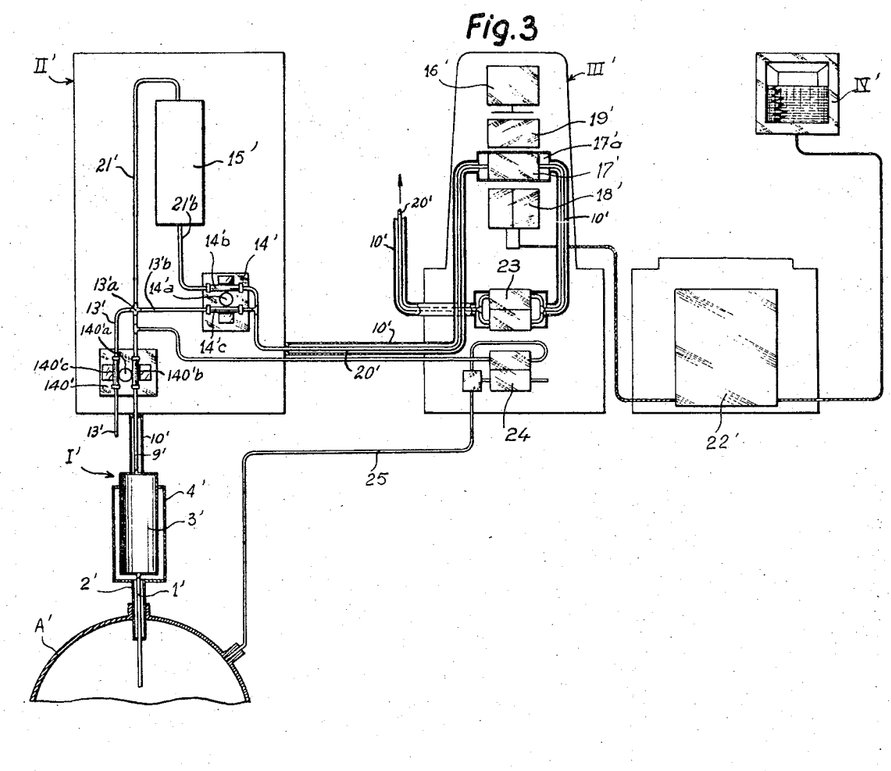
FIGURE 3 shows similar plant for use where the effluent gas is at subatmospheric pressure.

It will be noted that the gas outlet pipe 9' of the sulfur separator 3' is in this case connected (by way of the selector valve 140' set to collapse tube 140'c and leave unrestricted 140'b, the purpose of which will appear later) through pipe 21' to the inlet of oxygenator 15' and to the compressible tube 14c' of selector switch 14' through juncture 13'a and pipe 13'b directly, i.e. without an interposed atmospheric pressure tank such as 8 (FIGURE 2). It will further be noted that the equal volume of air added to the gas sample at juncture 13'a is in this case injected into the outlet pipe from sulfur separator 3' by a dual-piston volumetric air pump 24, similar to pump 23, and in which the piston chamber pressure is equalized with the pressure of the sample gas by means of an equalizing pipe 25 connecting said pump with the gas conduit A'. Thus, the air/sample gas ratio will remain constant at all gas pressures, regardless of the pressure of the sample. As in the first embodiment, the selector valve 14' is cyclically operated with tube 14'b collapsed to cause the gas-air mixture to flow through tube 14'c and pipe 20' directly into the analyzer cell 17' in the $SO_2$ measuring phase of the cycle, and then with tube 14'c collapsed by way of pipe 21' oxygenation unit 15' and pipe 21'b in the $(H_2S+SO_2)$ phase of the cycle. For the reasons previously indicated, the analyzer cell 17' is in this case surrounded by a steam jacket 17'a for maintaining it at a temperature of about 140° C., i.e. above dew point, so as to maintain any water present in the gas flow in the vapour phase.

It should be understood in this respect that in the first case, where the gas to be analyzed was at or above atmospheric pressure, the water in the gas condenses at ambient temperature and collects in condensate trap 11a (FIGURE 2). At the inlet to the oxygenation reactor and in trap 20a at the inlet to the analyzer, while in the case of subatmospheric-pressure gas, such water is maintained in the form of vapour. The presence of water in the analyzed gas therefore introduces an error in the $(H_2S+SO_2)$ concentration measurement in both cases: in the first case the error is positive, being due to the partial dissolution of the $SO_2$ in the liquid water, and this error can amount in absolute value to about 0.2% regardless of the $SO_2$ concentration in the gas; in the second case the error is negative, being due to the fact that sulfur in vapour form remaining in the gas sample is oxidized to $SO_2$ in the catalytic reactor; however, this error is practically negligible since the partial pressure of sulfur is very low (less than $10^{-3}$ mm. Hg).

Figure 4:
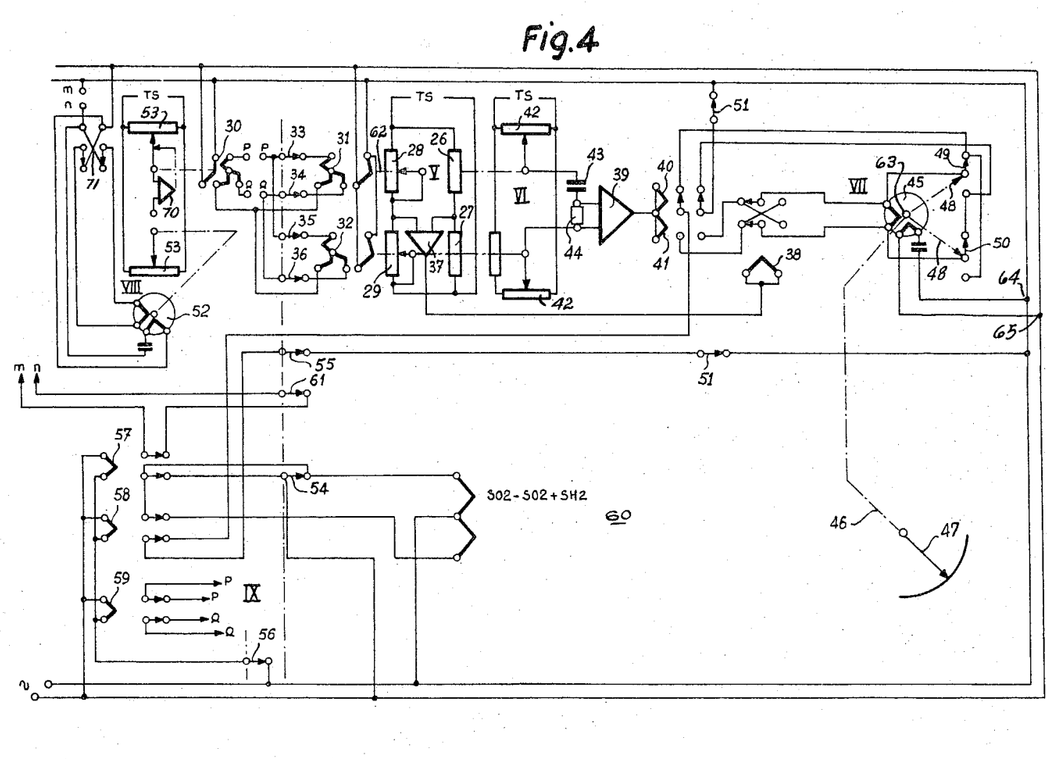
FIGURE 4 is a circuit diagram of the electrical part of the system.

Referring to FIGURE 4, an electrical system will now be described for regulating an input factor $x$ of the sulfur recovery plant, $x$ being, specifically, the gas/air ratio at the input to the plant, under control of the information provided by the analyzer system heretofore described, in such a manner as to maintain the $(H_2S+SO_2)$ concentration (herein called by) at a minimum value at all times, this condition manifesting optimum performance and maximum efficiency of the operation of the plant.

In the circuit shown in FIGURE 4, the output or load member, shown at 47, may be a regulator lever actuating a valve controlling the aforementioned ratio of acid gas to air at the input to the recovery plant. The input to the electrical system is shown in the form of a transmitted synchro 30. The rotatable, A.-C. energized, primary winding of the synchro is mechanically coupled for rotation with the recorder shaft of recorder IV (or IV'), so as to assume a position which, during an $SO_2$ measuring phase of the cycle, corresponds to the measured $SO_2$ concentration in the sample gas, and a position which, during an $(H_2S+SO_2)$ measuring cycle corresponds to the combined $(H_2S+SO_2)$ concentrations, as will be understood from previous explanations. The servo-system shown in FIGURE 4 broadly consists of a section V for computing the ratio $(H_2S/SO_2)=R$, and comparing said value to the numerical value 2; a section VI for detecting the variation $dy$ undergone by the quantity $y=(H_2S+SO_2)$ in response to a given variation $dx$ imposed on the input variable $x$=ratio of input gas/air; a section VII memorizing the sign of the $dx$ variation and also serving as an output circuit for developing the control factor, i.e. positioning the output member 47.

The ratio-computing section V comprises a Wheatstone bridge having two of its arms on one side of the power-input diagonal consisting of standard resistances 26 and 27, and its other two arms on the other side consisting of potentiometer resistances 28 and 29. The arm of potentiometer 28 is mechanically coupled, as indicated by a chain-line link 62, to the rotor of synchro receiver 31, which is one of two synchro receivers associated in respective conventional remote synchro positioning systems with the synchro transmitter 30. The arm of potentiometer 29 is similarly coupled to the rotor of the other synchro receiver 32 associated with the same transmitter 30. A conventional timing device, not shown, operates to connect receiver 31 and from transmitter 30 at the end of an $(H_2S+SO_2)$ measuring cycle through closure of contacts 33 and 34 and opening of contacts 35 and 36; and to connect receiver 32 and disconnect receiver 31 at the end of an $SO_2$ measuring cycle through closure of 35 and 36 and opening of 33 and 34. The input bridge diagonal of the Wheatstone bridge is connected across a source of constant alternating energy TS, while its output diagonal is connected to the input of a phase discriminating amplifier 37, the output of which is connected to a reversing relay switch 38 so as to actuate the switch to one or the other of its opposite positions depending on the phase condition of amplifier 37, and hence on the sign of the unbalance output, if any, of the Wheatstone bridge. The fixed resistances 26, 27, and the total potentiometer resistances 28 and 29 of the bridge are so predetermined that the ratio of the latter two resistances is three times the ratio of the former two resistances. Hence, the bridge is balanced and will deliver zero output into the amplifier 37, when the excursion of the arm of potentiometer 28 is three times the excursion of the arm of potentiometer 29; in other words, the bridge is balanced when the concentration ratio $(H_2S+SO_2)/SO_2=3$, or in other words, when $R=2$, R being the ratio $H_2S/SO_2$. When R exceeds 2, indicating an insufficient supply of air to the input of the sulfur recovery plant, the bridge is unbalanced in one sense, amplifier 37 puts out an output voltage of one phase, and reverser switch 38 is placed in one setting; when R is less than 2, indicating an excess of input air, the bridge is unbalanced in the reverse sense, amplifier 37 delivers an output of reverse phase, and switch 38 is placed in its reverse position.

The $dy$ detector section VI comprises a pair of potentiometers 42 connected in a normally balanced circuit across the constant voltage supply TS and having their movable arms mechanically coupled, as indicated by the chain-line link, to the rotor of synchro receiver 31 so as to be positioned in accordance with the measured $$(H_2S+SO_2)$$

concentration$=y$ value at the end of the related phase of the cycle. The arm of the upper potentiometer 42 is connected to one terminal of the input of an amplifier 39 by way of a differentiator network consisting of a series capacitor 43 and parallel resistor 44. The opposite input terminal of amplifier 39 is directly connected to the adjusting arm of the other potentiometer 42.

The output of amplifier 39 is connected to a two-winding reverser relay 40–41, so as to close the associated relay switch in its upper or its lower position according as the output of the amplifier 39 is of one or the other polarity. During a given $(H_2S+SO_2)$ or $y$-measuring phase of the regulating cycle, the arms of potentiometers 42 are positioned in accordance with the value of $y$ as measured during the preceding $y$-measuring phase, and the input to amplifier 39 is at this time zero. At the end of said phase, as synchro receiver 32 is connected in circuit with transmitter 30 by the timing means as earlier described, the potentiometer arms are displaced to a new position, assuming the value $y$ has changed during the cycle. Due to the differentiator network 43–44, this variation in $y$ (i.e. $dy$) injects a surge voltage into amplifier 39, of one or the other phase according as $y$ has increased or decreased (as $dy$ is positive or negative). The arrangement is such that for a voltage corresponding to $dy$ positive, contacts 41 are closed, while for a voltage corresponding to $dy$ negative contacts 40 are closed. The time during which either of these pairs of contacts remain closed, corresponds to the time required to dissipate the surge voltage through resistor 44, and hence is proportional to the absolute value of the variation $dy$. Specifically, it can be shown that the closure time T is proportional to the expression $$\text{Log } \frac{U_t}{U}CR$$

where $U_t$ is the threshold voltage of amplifier 39, U is the voltage change corresponding to this displacement of the potentiometer arm, C is the capacitance of 43 and $R_1$ the resistance of resistor 44, this latter preferably adjustable.

The section VII essentially comprises, in addition to the reversing switches mentioned above and referred to again presently, a reversible positioning motor 45 such as the two-phase induction motor schematically shown. The motor shaft 63 operates through linkage 46 the output member or regulator 47 acting on the input gas/air ratio of the plant to be regulated; said shaft through contact arm 48 also actuates memory switches 49 and 50 serving to memorize the previous direction of rotation of the motor as will presently appear. The fixed phase of the motor is connected across the A.-C. source as shown at 64 and 65, while its control phase is connected by way of the reverser switch associated with relay 38 to the respective contacts associated with relay winding 41, and also, by way of the memory contacts 49 and 50 respectively, to the contacts associated with relay winding 40. One of the two movable contacts associated with relay windings 40–41 is connected to one pole of the A.-C. source by way of a general cut-off switch 51, while the other of said movable contacts is connected by way of timing circuitry later described to the other A.-C. source terminal.

The part of the regulator circuit so far described operates as follows. At the instant synchro receiver 31 is connected to transmitter 30 at the end of a $y$-measuring cycle, the potentiometer arm in $dy$-detecting circuit VI is re-positioned in accordance with the value of $y$ (that is $H_2S+SO_2$ concentration) measured during the cycle. Assuming there has been a variation in $H_2S+SO_2$ concentration in the output gas of the plant, as will generally be true, this $dy$ quantity is sensed by the $dy$-senser VI as a voltage output from amplifier 39 corresponding in duration to the amount of said $dy$ quantity, and of one or opposite polarity depending on whether the $dy$ quantity is positive or negative. If negative ($H_2S+SO_2$ concentration has decreased) then contacts 40 are closed for a time T, and servo-motor 45 is rotated in one or the other direction according as its memory contacts 49 or its memory contacts 50 were closed during the preceding cycle, i.e. the motor will rotate in the same direction as it was rotated in the preceding cycle. The motor thus displaces the regulator 47 in the same direction as it displaced it in the preceding cycle, in other words it produces a variation $dx$ in the input quantity $x$ which is similar in sign to the preceding variation $dx$. This is required because the fact that the $(H_2S+SO_2)$ concentration$=y$ has decreased ($dy$ negative) indicates that the preceding adjustment of the input gas/air ratio was insufficient, and more adjustment in the same sense is necessary. The amount of corrective displacement imparted by motor 45 to the regulator element 47 is proportional to the time the contacts 40, remain closed, and hence to the absolute value of the concentration change $dy$, as previously explained.

If on the other hand the polarity from phase-discriminating amplifier 39 indicates a positive $dy$ ($H_2S+SO_2$ concentration has increased), then the contacts 41 are closed for the time T. In this case, as will be apparent from a study of the circuit connections involving the reverser switch 38, servo-motor 45 will be rotated in one or the opposite direction according as the ratio $(H_2S/SO_2)=R$ as indicated by the output polarity from amplifier 37 is greater than 2 or less than 2. Specifically, if said polarity indicates $R>2$, indicating that the gas/air ratio at the input to the plant is too great (not enough air), then motor 45 displaces regulator element 47 in the direction required to increase the input air supply (this direction is herein assumed to correspond to a positive variation $dx$ in the input variable $x$), regardless of whether the previous displacement of the regulator element was positive or negative; and if the polarity of the output from amplifier 37 indicates $R<2$, then motor 45 is rotated to displace regulator element 47 in the direction required to reduce the input air supply (i.e. a negative variation $-dx$ in the input variable), again regardless of the sense of previous displacement. The degree of corrective displacement applied is again proportional to the time of motor rotation, and hence to the absolute value of the change $dy$ in ($H_2S+SO_2$) concentration sensed.

The motor 45 will thus be controlled to displace the regulator element 47 in one or the other direction on termination of each y-measuring phase of the regulating cycle to impart corrective variations to the input gas/air ratio, until such time as the sensed variation in ($H_2S+SO_2$) concentration is substantially zero.

At this time, the ($H_2S+SO_2$) concentration in the output gas is the minimum attainable. This is true because, at every cycle that an increase in said combined concentration was sensed, indicating incorrect adjustment of the input gas/air ratio, said adjustment was altered in the requisite direction to increase or decrease said ratio according as the value of the ($H_2S/SO_2$) ratio sensed in the same cycle indicated that said ratio was too low or too high; while at every cycle that a decrease in the combined concentration was sensed, thereby indicating that the correction made in the preceding cycle was in the proper direction but insufficient in value, then said correction is repeated in the same direction. It is evident that such a recurrent process can only lead to a minimization of the combined ($H_2S+SO_2$) concentration in the output gases being analyzed.

The regulating circuit shown in FIGURE 4 further includes a section VIII for automatically correcting drift in the zero value of the analyzer. This section comprises a pair of potentiometers 53 connected in a balanced bridge circuit with the A.-C. source voltage being applied across the potentiometer resistances, while the potentiometer arms are applied to the input of an amplifier 70 the output of which provides a compensatory voltage. The potentiometer arms are mechanically coupled for displacement by a reversible two-phase motor 52. The fixed phase of the motor is connected across the A.-C. source, while the control phase is connected across said source by way of a reverser switch 71. Returning to FIGURES 1 and 3, it will be recalled that the gas flow circuit there shown includes an auxiliary selector switch device 140 or 140'. It will be evident from the figures that when the lower compressible tube of device 140, or the left-hand compressible tube of device 140', is collapsed, then the system operates in the manner earlier described, while when the upper tube 140b of device 140 or the right tube 140'b of device 140' is collapsed instead, each system operates to discharge simple atmospheric air through pipes 13 and 13', free of gas, through the analyzer. The control solenoid of device 140 (or 140') is periodically operated, under control of the timing unit, so as to cause such as an air-flushing cycle to occur at periodic intervals, once every 48 measuring cycles. During this flushing phase, the analyzer cell 17 (or 17') should normally deliver a zero potential and the recorder stylus should accordingly indicate zero. The recorder III (or III') is provided with a pair of limit switches positioned a small distance away to either side from the zero position and corresponding to the reversing switch contacts designated 71 in FIGURE 4. During the flushing operation, if the stylus is positioned between said limit switches, that is within a permissible range of off-zero tolerance, both switches remain open, so that the reverser switch remains at an intermediate position in which the control phase of motor 52 is deenergized. The motor remains stationary and the potentiometer arms remain in a position in which the circuit is balanced and the amplifier 70 delivers zero output. Should the recorder stylus actuate one of the two limit switches during the flushing phase, indicating excessive off-zero drift in a certain direction, reverser switch 71 is closed in one of its two positions, e.g. in the lower position shown, causing motor 52 to rotate in a corresponding sense, whereupon the amplifier 70 will deliver an unbalance voltage of a corresponding phase, and this corrective output is applied to the electromagnetic actuating means (not shown) of the stylus of recorder III (or III') to reposition said stylus within its zero range, at which time motor 52 stops.

Part of the timing circuitry serving to control the operating sequences described above is shown in the section IX of FIGURE 4. This section will be conveniently described with reference to the timing charts of FIGURES 5 and 6.

Figure 5:
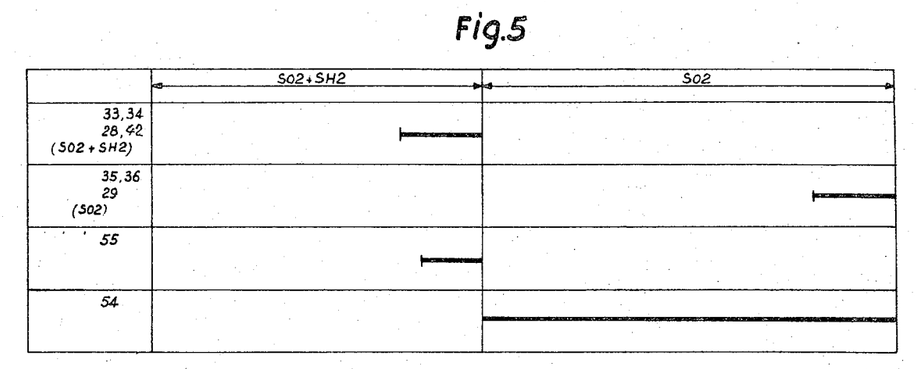
FIGURES 5 and 6 are timing charts used in explaining the operation of the system.
Figure 6:
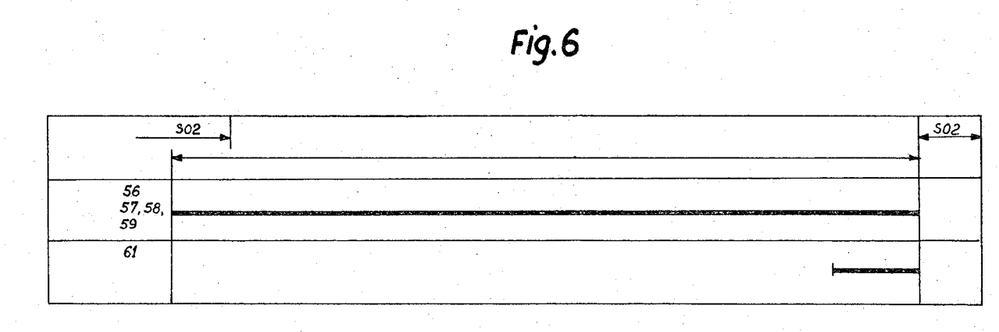

FIGURE 5 illustrates a normal regulating cycle, including a first, or ($H_2S+SO_2$) measuring phase, and a second or $SO_2$ measuring phase. The duration of each phase may be 2½ minutes as earlier indicated. In this chart the solid black lines indicate the closed condition of certain contacts involved. In the first phase, the bottom line of the chart being blank from start to end of this phase indicates that contacts 54 (FIGURE 4) are open throughout the phase. Contacts 54, when open, deenergize the actuating solenoid of selector valve device 14 (or 14'), causing the gas flow to follow the path from the sampler I (or I') to analyzer III (or III') by way of the oxygenation reactor 15 (15'), as is required for the combined concentration measurement. The chart further shows in its uppermost line that the contacts 33 and 34 are closed for a short period towards the end of the phase. It will be recalled that closure of these contacts connects synchro receiver 31 to transmitter 30, so that the total ($H_2S+SO_2$) content indication is then transmitted to position the arms of potentiometers 28 and 42 accordingly. Also, during another short period towards the ends of the phase, as shown in the third line of the chart, contacts 55 are closed. These contacts as shown in FIGURE 4 are interposed in the energizing circuit for the control phase of servo-motor 45, so as to permit at that time the operation of the regulating section VII, in the manner described above.

During the second phase of the regulating cycle, it will be seen from the chart that contacts 54 remain closed throughout the phase, to actuate selector switch device 14 (14') to the position in which the gas flow is bypassed around the oxygenation reactor 15 (15') as is necessary for $SO_2$ concentration measurement. For a short period towards the end of the phase, contacts 35 and 36 are both closed, as indicated in the second line of the chart, to connect synchro receiver 32 to transmitter 30 for positioning potentiometer 29 in accordance with the indicated $SO_2$ concentration. It will be noted that through this period the contacts 55 remain open, so that the servo-motor 45 operating the regulator element 47 is prevented from operating. As earlier stated, the motor is operated only once per full regulating cycle.

The opening and closure of the various switches and contacts are produced by any suitable timing means, electronic or mechanical, e.g. cams driven in constant speed rotation. Once every 48 full regulating cycles, the timing system closes a normally-open switch 56 (FIGURE 4) connected across the A.-C. supply in series with three relay windings 57, 58, 59. The switch 56 is closed at the end of an $SO_2$ measuring phase of a cycle and endures one full regulating cycle, as indicated by the solid line in the upper part of the chart of FIGURE 6. The normally deenergized relays 57, 58, 59 are then energized. Energization of relay 58 closes a pair of normally-open related contacts so that on subsequent closure of switch 54 during the $SO_2$ measuring phase of the cycle involved, the actuating solenoid of selector switch device 140 (or 140') is energized, to switch off the sample gas flow through the system and discharge a flow of flushing air instead, as earlier described with reference to the zero drift correcting function. As shown in the lower part of the chart, a switch 61 is closed for a short time during the end of the next ($H_2S+SO_2$) measuring cycle. As shown in FIGURE 4, switch 61 is connected across the points $m$ and $n$ at the top of FIGURE 4 between a terminal of the fixed phase of servo-motor 52 and the A.-C. supply, so that closure of this normally-open switch permits operation of the zero-correcting servo-motor 52 in the manner earlier described. Energization of relay 57 actuates normally-open contacts in series with switch 61 and switch 54 respectively. Energization of relay 59 opens normally-closed contacts connected across the points P and Q respectively so as to disable both synchro positioning systems 30–31 and 30–32. When switch 56 is again opened, the zero drift correcting cycle thus described is terminated and the normal regulating process previously described resumes.

Many changes can of course be made in the details of the circuits and apparatus illustrated and described without exceeding the scope of the invention.

I claim:

1. A regulating system for automatically monitoring a chemical process in which the sum of two effluent constituents is to be held at an extremum condition for optimum performance of the process and wherein the ratio of said constituents is greater or less than a predetermined optimum quantity which corresponds to an operating parameter of said process being on one or the other side of its optimum theoretical value, comprising; means for repeatedly removing a sample from said effluent and for conducting said sample to analyzing and control means comprising means for determining said sum of constituents in each sample; means for determining said ratio of constituents in each sample; means for determining the sense of variation in said sum as between each sample and the preceding sample; means for adjusting said parameter; means for memorizing the sense of adjustment of said parameter at each adjustment thereof; means responsive to said sense-of-variation determining means and to said memorizing means and operatively connected to said adjusting means for adjusting said parameter in the same sense as that memorized by said memorizing means if the sense-of-variation determined is of one sign; and means responsive to said sense-of-variation determining means and to said ratio-determining means and operatively connected to said adjusting means for adjusting said parameter in one sense if the sense of variation determined is of the opposite sign and said ratio is less than said predetermined quantity and for adjusting said parameter in the opposite sense if the sense of vibration determined is of said opposite sign and said ratio is more than said predetermined quantity, whereby repeatedly to adjust said parameter to bring and thereafter hold said sum of constituents to and at its extremum condition.

2. A regulatory system according to claim 1 for the regulation of a reactor producing sulphur by the oxidation of an $H_2S$ containing gas comprising means for repeatedly sampling the effluent of the reactor and for conducting the sample to an analyzing and control means; analyzing and control means receiving said sample for alternatively measuring the $SO_2$ content and then the sum of the $SO_2$ and $H_2S$ content of said sample; electronic means for establishing the ratio $H_2S/SO_2$ and for assuring the constant functioning of the process at a predetermined value for said ratio and for minimizing the sum of the $H_2S$ and $SO_2$ content of said effluent.

3. A system for the control of a chemical process according to claim 1 further including analyzing and control means; oxygenation reactor means; means for repeatedly sampling the effluent and for conducting said sample to analyzing and control means; means for mixing said sample with an equal volume of oxygen containing gas and for alternatively conducting said mixed sample directly to said analyzing means or through said oxygenation reactor and then to said analyzing means whereby the quantity of a single constituent and the sum of the two constituents are alternatively determined; and means for establishing a ratio of said two constituents from said sum and quantity and for generating a signal to actuate a final control element of the input to bring said ratio to an optimum value and to bring said sum to the extreme value.

4. A regulating system for automatically monitoring a chemical process in which the sum of two effluent constituents is to be held at a minimum for optimum performance of the process and wherein the ratio of said constituents is greater or less than a predetermined optimum quantity which corresponds to an operating parameter of said process being on one or the other side of its optimum theoretical value, comprising; means for repeatedly removing a sample from said effluent and for conducting said sample to analyzing and control means comprising means for determining said sum of constituents in each sample; means for determining said ratio of constituents in each sample; means for determining the sense of variation in said sum as between each sample and the preceding sample; means for adjusting said parameter; means for memorizing the sense of adjustment of said parameter at each adjustment thereof; means responsive to said sense-of-variation determining means and to said memorizing means and operatively connected to said adjusting means for adjusting said parameter in the same sense as that memorized by said memorizing means if the sense-of-variation determined corresponds to a decrease in said sum; and means responsive to said sense-of-variation determining means and to said ratio-determining means and operatively connected to said adjusting means for adjusting said parameter in one sense if the sense of variation determined corresponds to an increase in said sum and said ratio is less than said predetermined quantity and for adjusting said parameter in the opposite sense if the sense of variation determined corresponds to an increase in said sum and said ratio is more than said predetermined quantity, whereby repeatedly to adjust said parameter to bring and thereafter hold said sum of constituents to and at its minimum condition.

5. A regulating system for automatically monitoring a sulfur-recovery process involving the oxidation reaction of an input gas containing $H_2S$ in such a manner as to maintain the sum of $(H_2S+SO_2)$ concentrations in the effluent gas at a minimum for maximizing the efficiency of the process, comprising; means for repeatedly removing a sample from said effluent and for conducting said sample to analyzing and control means comprising means for determining said sum of $(H_2S+SO_2)$ concentrations in each sample; means for determining the ratio of $(H_2S/SO_2)$ concentrations in each sample; means for determining the sense of variation of said $(H_2S+SO_2)$ sum as between each sample and the preceding sample; means for adjusting the ratio of input gas to oxygen at the input to said oxidation reaction; means for memorizing the sense of adjustment of said input ratio at each adjustment thereof; means responsive to said sense-of-variation determining means and to said memorizing means and operatively connected to said adjusting means for adjusting said input ratio in the same sense as that memorized if the sense-of-variation determined corresponds to a decrease in $(H_2S+SO_2)$ concentration; and means responsive to said sense-of-variation determining means and to said $(H_2S/SO_2)$ ratio-determining means and operatively connected to said adjusting means for increasing the input gas/oxygen ratio if the sense of variation determined corresponds to an increase in $(H_2S+SO_2)$ sum and said $(H_2S/SO_2)$ ratio is less than a predetermined numerical factor, and for reducing the input gas/oxygen ratio if the sense of variation determined corresponds to an increase in $(H_2S+SO_2)$ sum and said $(H_2S/SO_2)$ ratio is greater than said factor whereby repeatedly to adjust said input gas/oxygen ratio to bring and thereafter hold said sum of $(H_2S+SO_2)$ concentrations in the effluent to and at its minimum condition.

References Cited by the Examiner

UNITED STATES PATENTS 3,026,184   3/1962   Karasek _____________ 23—255

MORRIS O. WOLK, *Primary Examiner.*

JOSEPH SCOVRONEK, *Examiner.*

H. A. BIRENBAUM, *Assistant Examiner.*